United States Patent
Mehta et al.

(10) Patent No.: US 10,291,533 B1
(45) Date of Patent: May 14, 2019

(54) SYSTEMS AND METHODS FOR NETWORK TRAFFIC MONITORING

(71) Applicant: Big Switch Networks, Inc., Santa Clara, CA (US)

(72) Inventors: Munish Mehta, Fremont, CA (US); Robert Edward Adams, Sunnyvale, CA (US); Rao Sandeep Hebbani Raghavendra, Sunnyvale, CA (US); Srinivasan Ramasubramanian, Redwood City, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 38 days.

(21) Appl. No.: 14/661,336

(22) Filed: Mar. 18, 2015

Related U.S. Application Data

(62) Division of application No. 13/754,671, filed on Jan. 30, 2013, now Pat. No. 9,787,567.

(51) Int. Cl.
  *H04L 12/26* (2006.01)
  *H04L 12/813* (2013.01)
  (Continued)

(52) U.S. Cl.
  CPC .......... *H04L 47/20* (2013.01); *H04L 41/0806* (2013.01); *H04L 41/12* (2013.01); *H04L 43/06* (2013.01); *H04L 47/31* (2013.01)

(58) Field of Classification Search
  None
  See application file for complete search history.

(56) References Cited

U.S. PATENT DOCUMENTS

| | | |
|---|---|---|
| 7,529,180 B1 | 5/2009 | Karl et al. |
| 7,577,098 B2 | 8/2009 | Tamura et al. |

(Continued)

FOREIGN PATENT DOCUMENTS

| | | |
|---|---|---|
| EP | 1289191 | 3/2003 |
| EP | 2621136 | 7/2013 |

(Continued)

OTHER PUBLICATIONS

Mehta et al., U.S. Appl. No. 13/754,671, filed Jan. 30, 2013.

(Continued)

*Primary Examiner* — Chirag G Shah
*Assistant Examiner* — Amar Persaud
(74) *Attorney, Agent, or Firm* — Treyz Law Group, P.C.; Tianyi He

(57) ABSTRACT

A packet forwarding network may include switches that forward network traffic between end hosts and network tap devices that forward copied network traffic to an analysis network formed from client switches that are controlled by a controller. Network analysis devices and network service devices may be coupled to the client switches at interfaces of the analysis network. The controller may receive one or more network policies from a network administrator. A network policy may identify ingress interfaces, egress interfaces, matching rules, packet manipulation services to be performed. The controller may control the client switches to generate network paths that forward network packets that match the matching rules from the ingress interfaces to the egress interfaces through service devices that perform the services of the list. The controller may generate network paths for network policies based on network topology information and/or current network conditions maintained at the controller.

10 Claims, 18 Drawing Sheets

(51) Int. Cl.
*H04L 12/24* (2006.01)
*H04L 12/833* (2013.01)

(56) References Cited

U.S. PATENT DOCUMENTS

| | | |
|---|---|---|
| 7,710,867 B1 | 5/2010 | Masters |
| 8,098,572 B2 | 1/2012 | Zhou et al. |
| 8,300,523 B2 | 10/2012 | Salam et al. |
| 8,321,555 B2 | 11/2012 | Gunther |
| 8,321,938 B2 | 11/2012 | Strayer et al. |
| 8,565,108 B1 | 10/2013 | Marshall et al. |
| 8,566,649 B1 | 10/2013 | Bishara |
| 8,665,699 B2 | 3/2014 | Bellagamba et al. |
| 8,819,235 B2 | 8/2014 | Cardona et al. |
| 9,143,438 B2* | 9/2015 | Khan ............ H04L 45/308 |
| 9,184,995 B2 | 11/2015 | Leong |
| 9,774,520 B1* | 9/2017 | Kasturi ............ H04L 45/00 |
| 2002/0131369 A1* | 9/2002 | Hasegawa ............ H04L 41/12 370/241 |
| 2003/0105881 A1 | 6/2003 | Symons et al. |
| 2003/0208618 A1 | 11/2003 | Mor et al. |
| 2004/0003094 A1* | 1/2004 | See ............ H04L 43/026 709/227 |
| 2004/0013120 A1 | 1/2004 | Shen |
| 2004/0139236 A1 | 7/2004 | Mehra et al. |
| 2006/0031374 A1 | 2/2006 | Lu et al. |
| 2006/0059163 A1* | 3/2006 | Frattura ............ H04L 12/4633 |
| 2006/0098589 A1 | 5/2006 | Kreeger et al. |
| 2006/0209699 A1* | 9/2006 | Tamura ............ H04L 41/046 370/242 |
| 2006/0218404 A1* | 9/2006 | Ogura ............ 713/178 |
| 2007/0295395 A1* | 12/2007 | Phillips ............ B82Y 10/00 136/255 |
| 2008/0189769 A1 | 8/2008 | Casado et al. |
| 2009/0080338 A1 | 3/2009 | Parker |
| 2009/0097418 A1* | 4/2009 | Castillo ............ H04L 41/12 370/255 |
| 2010/0020680 A1 | 1/2010 | Salam et al. |
| 2010/0080226 A1* | 4/2010 | Khalid ............ H04L 41/5003 370/392 |
| 2010/0242093 A1 | 9/2010 | Zuk et al. |
| 2010/0315943 A1 | 12/2010 | Chao et al. |
| 2011/0087979 A1* | 4/2011 | Breslin ............ H04L 12/26 715/764 |
| 2011/0268125 A1 | 11/2011 | Vobbilisetty et al. |
| 2012/0250679 A1 | 10/2012 | Judge |
| 2012/0278477 A1* | 11/2012 | Terrell ............ H04L 41/5009 709/224 |
| 2013/0010600 A1 | 1/2013 | Jocha et al. |
| 2013/0022767 A1 | 1/2013 | Ahmad et al. |
| 2013/0028072 A1 | 1/2013 | Addanki |
| 2013/0058354 A1 | 3/2013 | Casado et al. |
| 2013/0070608 A1* | 3/2013 | McCanne ............ H04L 67/1097 370/241 |
| 2013/0073743 A1* | 3/2013 | Ramasamy et al. ............ 709/238 |
| 2013/0215769 A1* | 8/2013 | Beheshti-Zavareh ............ H04L 45/64 370/252 |
| 2013/0227670 A1* | 8/2013 | Ahmad et al. ............ 726/11 |
| 2013/0242998 A1 | 9/2013 | Deshpande |
| 2014/0036924 A1 | 2/2014 | Christenson |
| 2014/0149569 A1* | 5/2014 | Wittenstein ............ H04L 43/12 709/224 |
| 2014/0198649 A1 | 7/2014 | Jain et al. |
| 2016/0020939 A1 | 1/2016 | Ramasubramanian et al. |
| 2016/0197836 A1* | 7/2016 | Hussain ............ H04L 45/00 713/160 |

FOREIGN PATENT DOCUMENTS

| | | |
|---|---|---|
| EP | 2629464 | 8/2013 |
| WO | 01/63838 | 8/2001 |
| WO | 2013118873 | 8/2013 |

OTHER PUBLICATIONS

Mehta et al., U.S. Appl. No. 13/776,419, filed Feb. 25, 2013.
Emmadi et al., U.S. Appl. No. 14/618,635, filed Feb. 10, 2015.
Pfaff et al., OpenFlow Switch Specification, Dec. 31, 2009, 42 pages.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ADDITIONAL PACKET INFORMATION (E.G., HEADERS) | ACTION |
|---|---|---|---|---|---|---|---|---|
| * | * | 00:1FAB | * | * | * | * | | SEND TO PORT 3 |
| * | * | * | * | 172.12.3.4 | * | * | ⋮ | SEND TO PORT 4 |
| * | * | * | * | * | * | 80 | | DROP |

FIG. 6B

| LINK | NUMBER OF POLICIES | NUMBER OF MATCHING RULES | BAMDWIDTH REQUIRMENTS | CURRENT BANDWIDTH USAGE |
|---|---|---|---|---|
| SW10-SW11 | ≀ | ≀ | ≀ | ≀ |
| SW11-SW12 | ≀ | ≀ | ≀ | ≀ |
| ... | | | | |

FIG. 16

SYSTEMS AND METHODS FOR NETWORK TRAFFIC MONITORING

This application claims priority to U.S. patent application Ser. No. 13/754,671 filed on Jan. 30, 2013, which is incorporated herein in its entirety.

BACKGROUND

This relates to communication networks, and more particularly, to communications networks having network switches that are controlled by a controller.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

It is often desirable to monitor network traffic that flows through a network. Conventional network monitoring often utilizes a network tap that is interposed between switches of the network. The network tap includes a monitor port that is directly coupled to a monitoring device and copies network traffic that flows between the switches of the network. The copied network traffic is provided to the monitoring device via the monitor port. In some scenarios, a switch may have a dedicated tap port at which copied network traffic is provided (i.e., network taps may be integrated into switch equipment). However, it can be challenging to monitor networks using such arrangements as the networks increase in size and complexity. For example, in order to monitor network traffic at multiple network locations, network taps and corresponding monitoring devices must be provided at each of the network locations, which increases cost and leads to inefficient use of network monitoring resources.

SUMMARY

A packet forwarding network may include switches that forward network traffic between end hosts that are coupled to the packet forwarding network. An analysis network that is not used to forward network traffic between end hosts of the packet forwarding network may be coupled to the packet forwarding network. The packet forwarding network may include network tap devices that are interposed between switches in the packet forwarding network. Each tap device may include a monitor port that is coupled to an ingress interface of the analysis network (e.g., a switch port). The network tap devices may copy network traffic that flows through the switches of the packet forwarding network and forward the copied network traffic to the analysis network via the monitor port.

The analysis network may include client switches that are controlled by a controller. Network analysis devices and network service devices may be coupled to the client switches at interfaces of the analysis network. The interfaces at which network analysis devices are coupled to may be referred to as egress interfaces, whereas interfaces to which network service devices are coupled may be referred to as intermediate interfaces. The network service devices may perform packet manipulation services such as timestamping, packet slicing, or other packet manipulation services. The controller may control the client switches of the analysis network to forward copied network packets received at ingress interfaces to egress interfaces (e.g., by providing flow table entries to the client switches).

The controller may receive one or more network policies from a user such as a network administrator. A network policy may identify a set of ingress interfaces, a set of egress interfaces, and a list of packet manipulation services to be performed. The list of services may be arranged in a sequence. The controller may control the client switches to generate network paths that forward network packets from the ingress interfaces to the egress interfaces of the network policy. The controller may select a service device to perform each service of the list of services. If desired, a selected service device may perform multiple services. The network policy may include matching rules. The controller may direct the client switches to forward only network packets having header fields that match the matching rules from the ingress to the egress interfaces.

The controller may generate network paths for network policies based on network topology information maintained at the controller. The controller may, if desired, maintain information identifying current network policy and traffic conditions. The current network conditions may be used by the controller to generate network paths while ensuring that network traffic load is balanced among client switches of the analysis network. If desired, constraints such as bandwidth requirements or predetermined network paths to include in the generated network paths may be specified in the network policies.

Further features of the present invention, its nature and various advantages will be more apparent from the accompanying drawings and the following detailed description.

BRIEF DESCRIPTION OF THE DRAWINGS

FIG. 6B is a diagram of an illustrative flow table of the type that may be used by a packet processing system showing three illustrative types of packet forwarding that may be performed based on the flow table entries of the flow table in accordance with an embodiment of the present invention.

FIG. 16 is an illustrative network conditions table that may be maintained by a controller to identify network traffic and policy conditions in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. As examples, the switches may include routers, firewalls, load balancers, or other packet forwarding systems. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
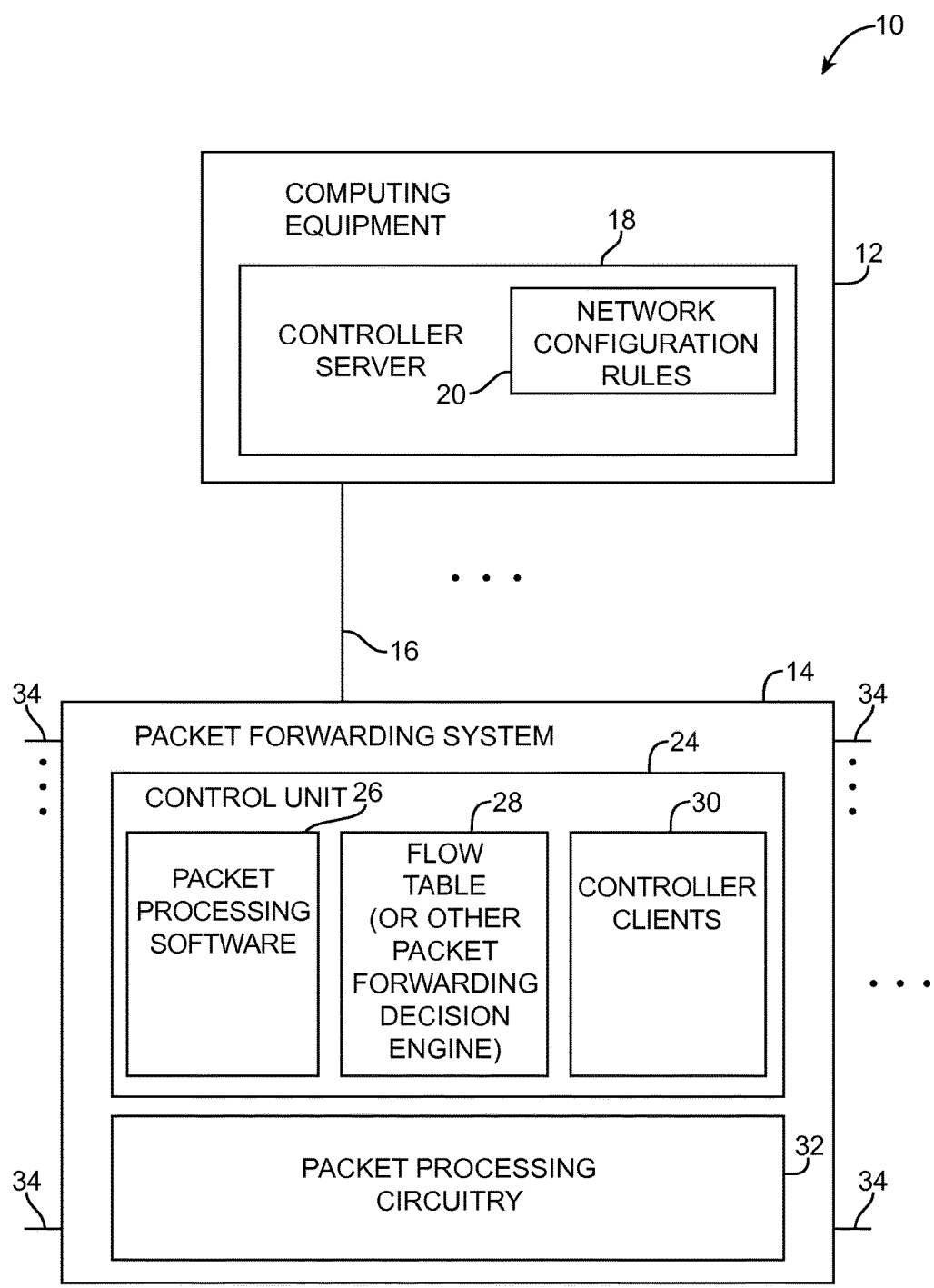
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (e.g., each packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Figure 2:
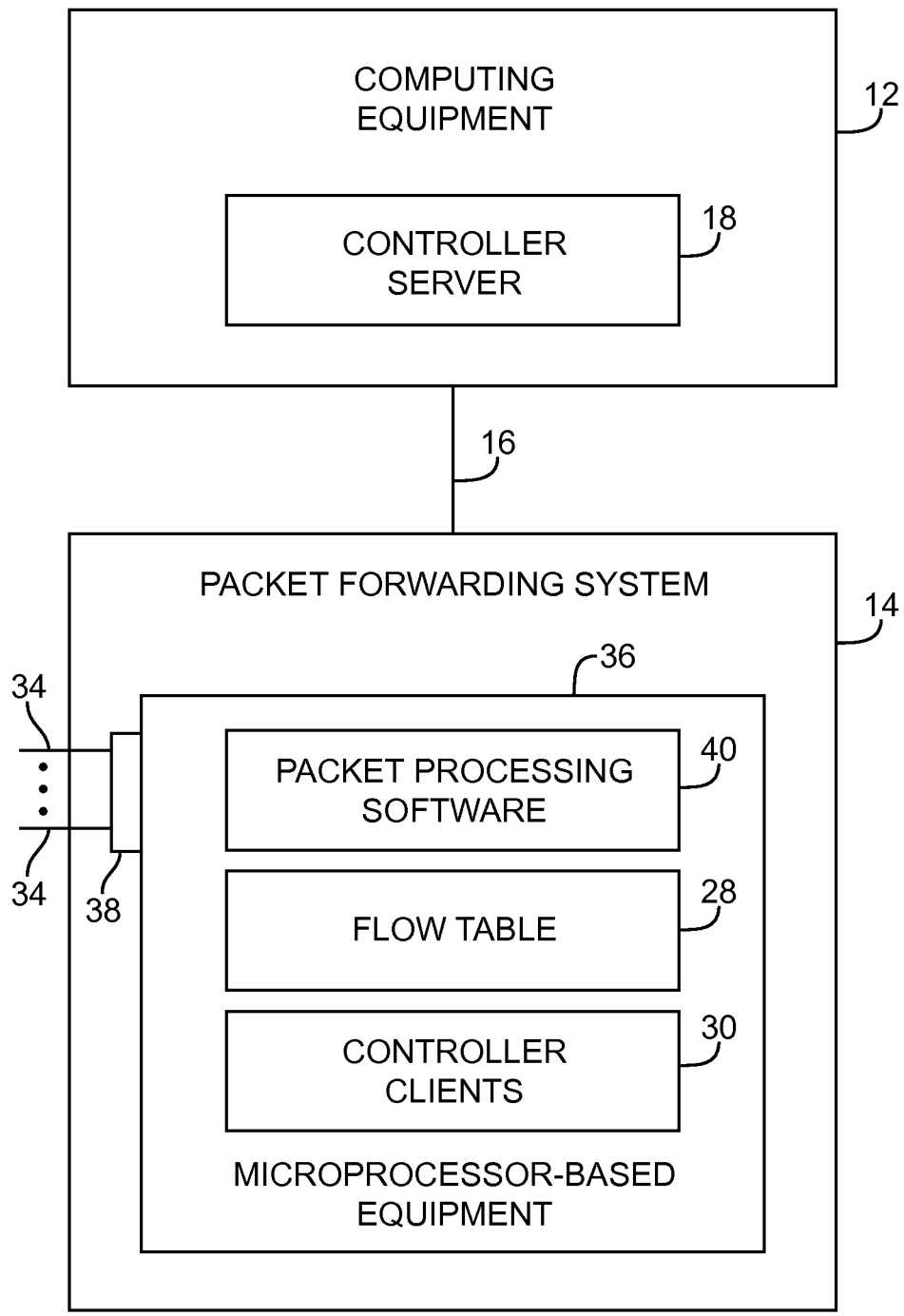
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
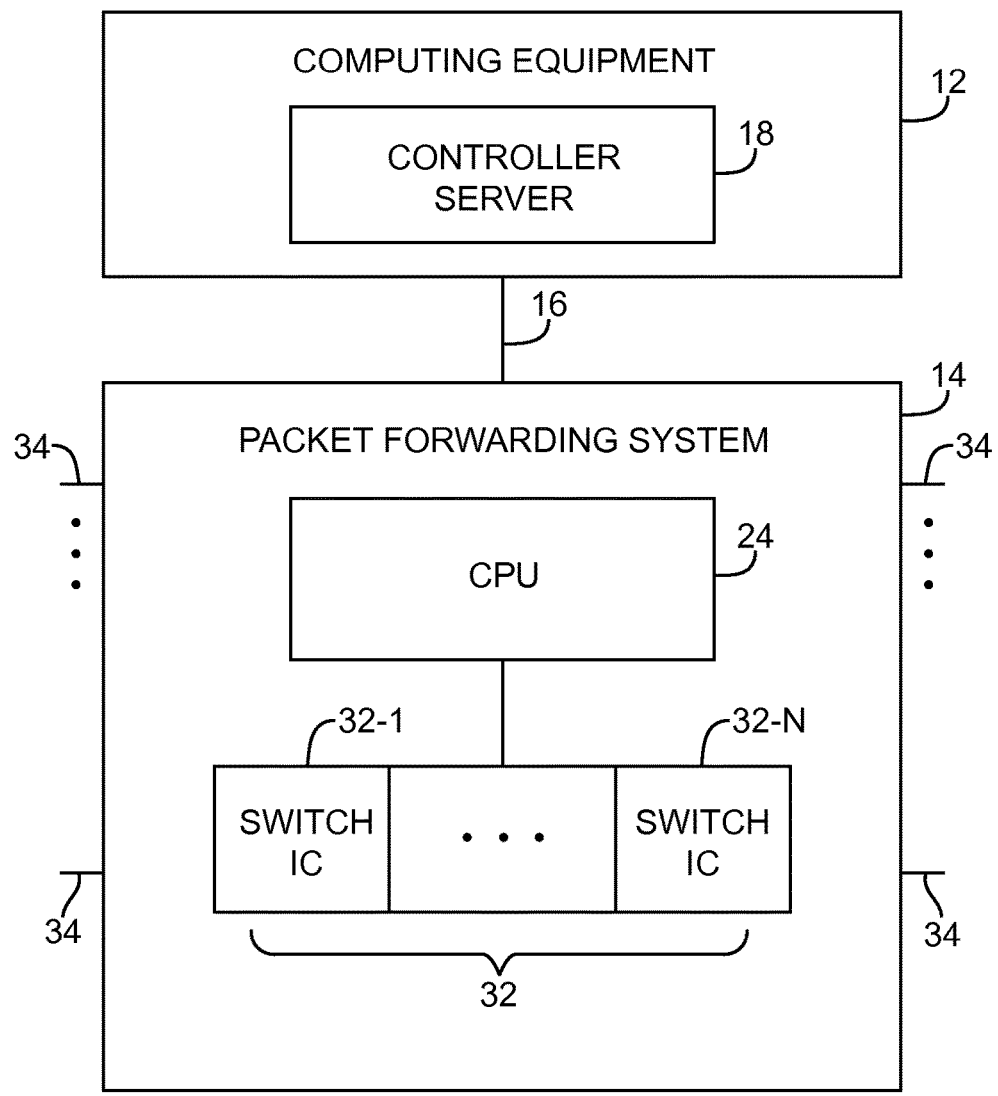
FIG. 3 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
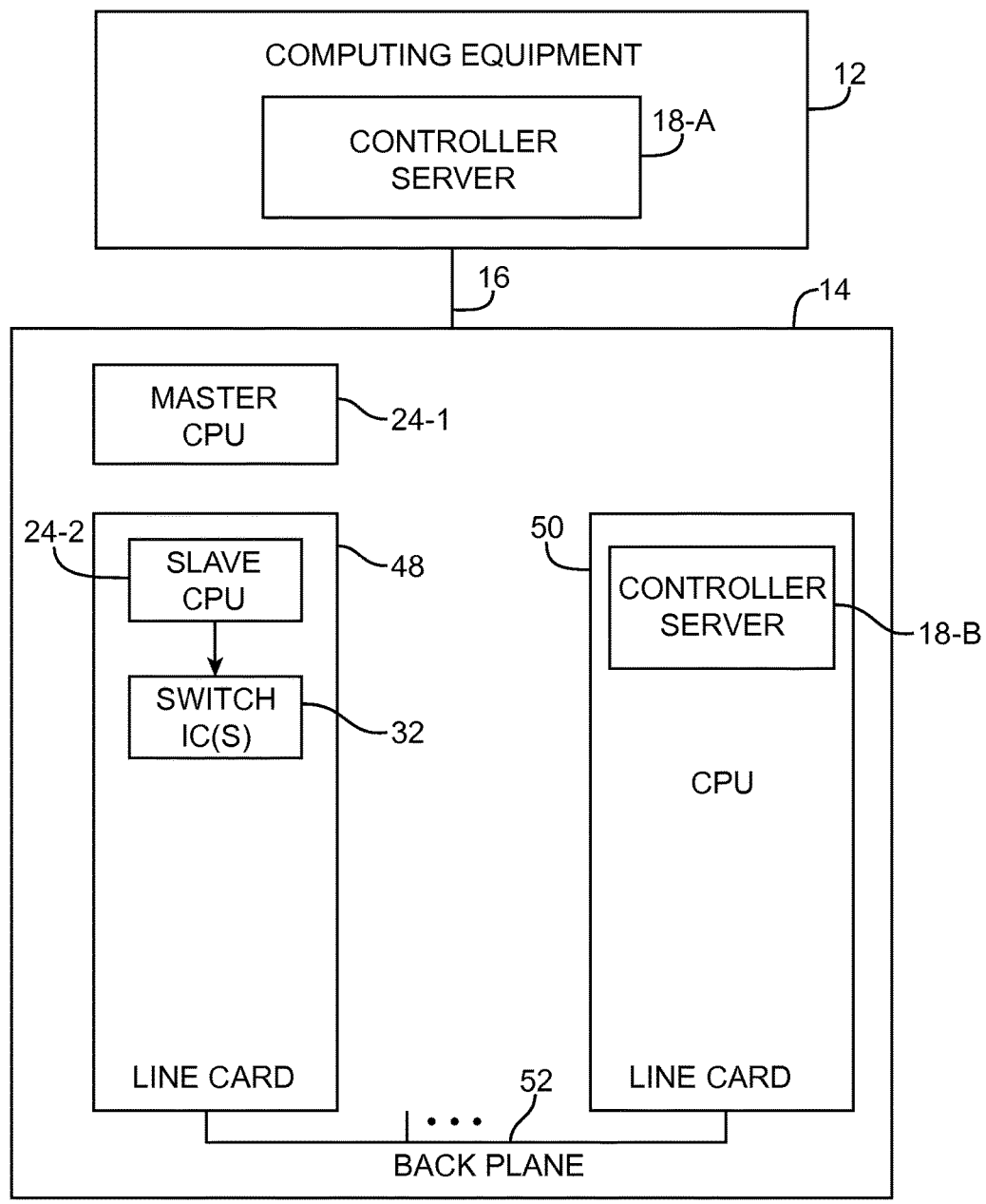
FIG. 4 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 4. In the FIG. 4 example, switch 14 (e.g., or other packet forwarding systems) may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
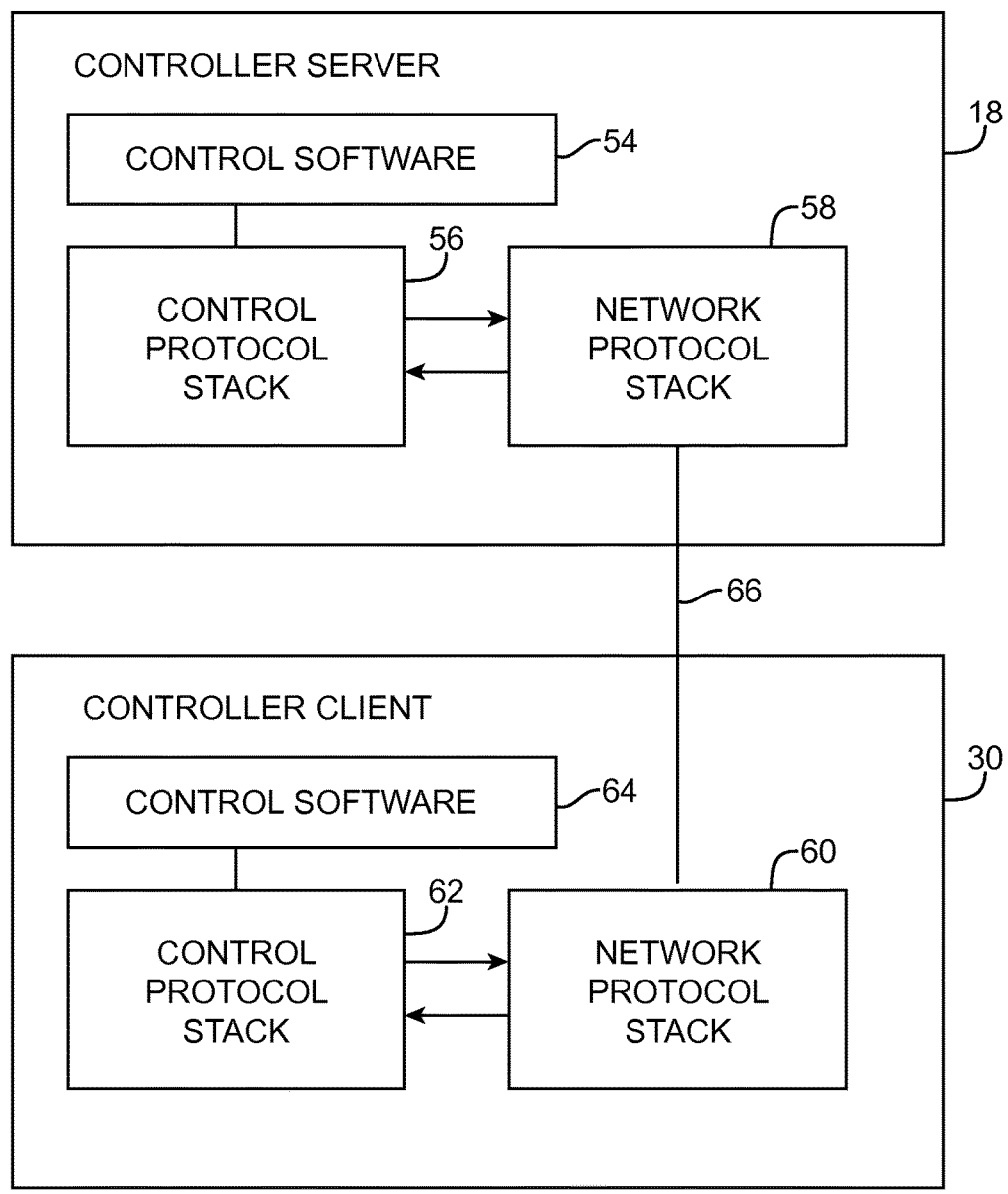
FIG. 5 is a diagram of a controller server and controller client that may communicate over a network connection in accordance with an embodiment of the present invention.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
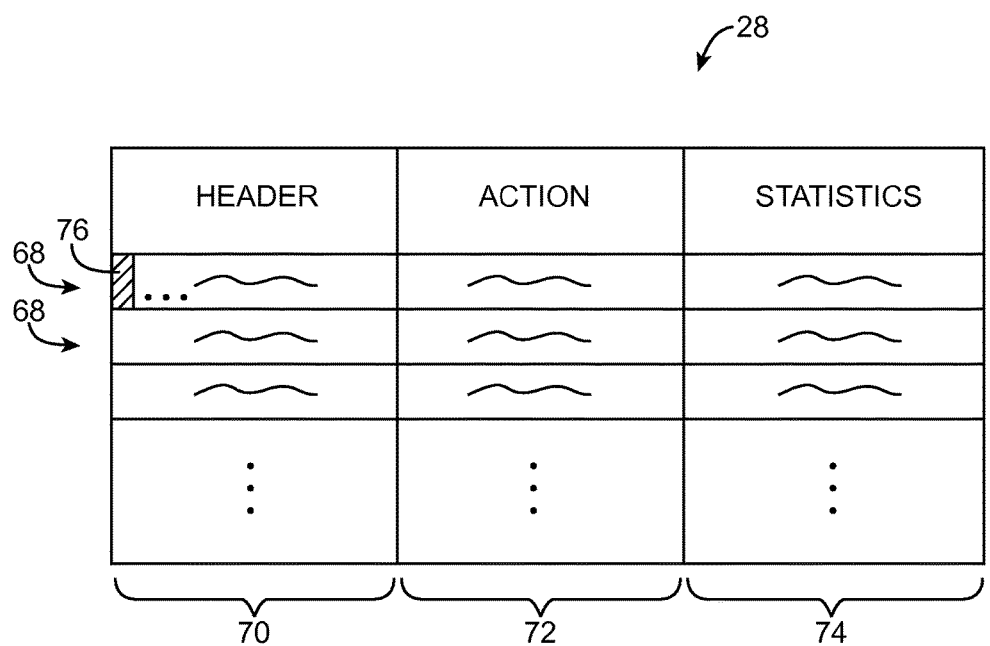
FIG. 6A is a diagram of an illustrative flow table of the type that may be used by a packet processing system in accordance with an embodiment of the present invention.

An illustrative flow table is shown in FIG. 6. As shown in FIG. 6A, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet. Additional fields may match additional packet information (e.g., packet header information of network packets).

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switches such as switch 14. In a network with numerous switches 14, each switch can be provided with appropriate flow table entries to form a path through the network.

Figure 7:
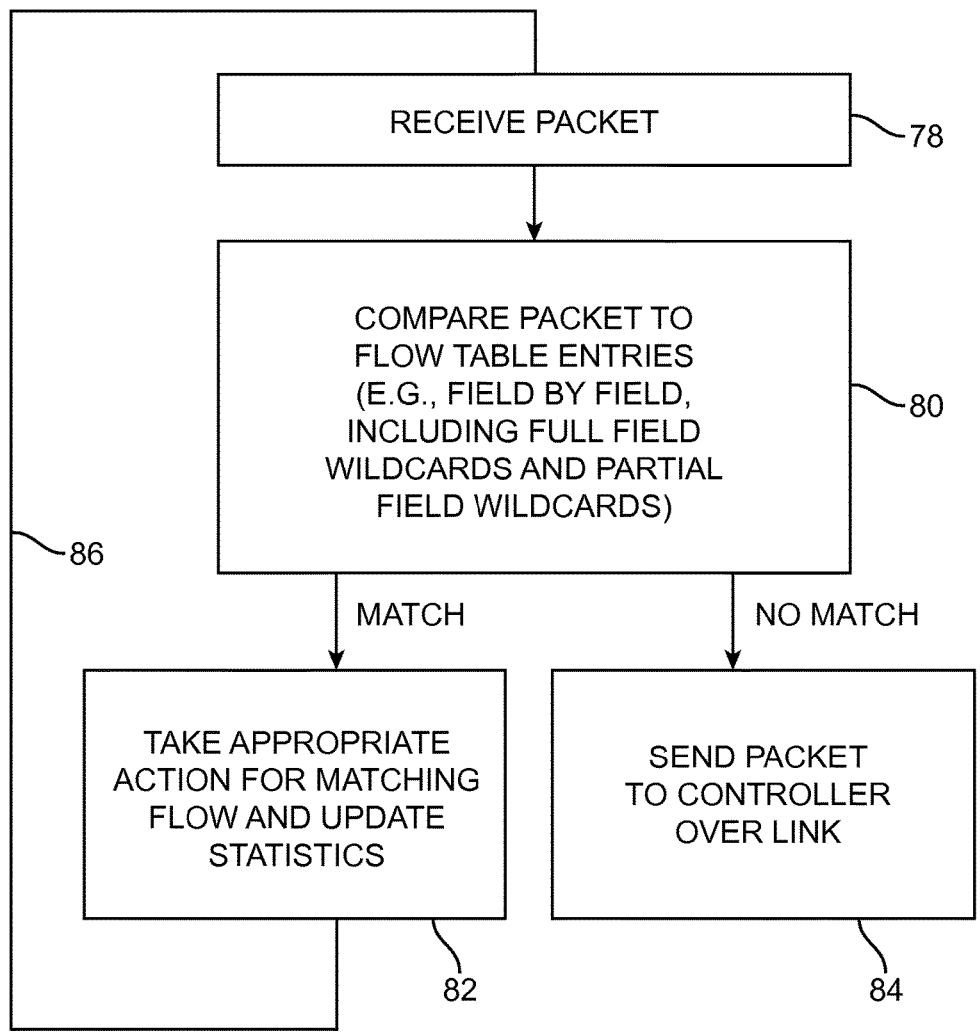
FIG. 7 is a flow chart of illustrative steps involved in processing packets in a packet processing system in accordance with an embodiment of the present invention.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (e.g., complete addresses). Other fields may contain wildcards (i.e., fields marked with the "don't care" wildcard character of "*"). Yet other fields may have partially complete entries (e.g., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 8:
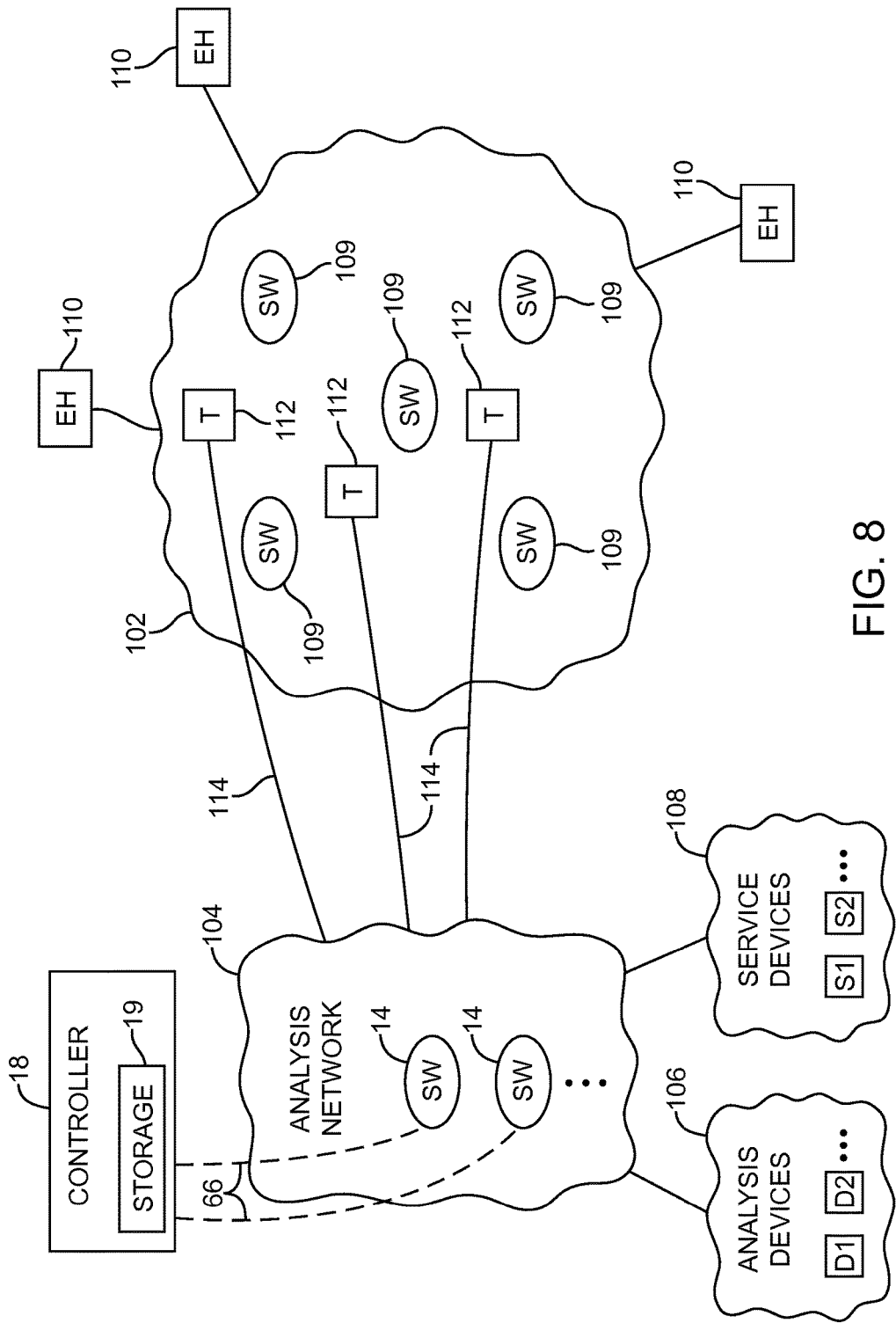
FIG. 8 is an illustrative diagram of an analysis network that is coupled to a packet forwarding network in which a controller may control client switches in the analysis network in accordance with an embodiment of the present invention.

As networks grow in complexity and size, there is increasing interest and need for network analysis and monitoring. It is generally desirable to perform such network analysis without interrupting normal network operations (e.g., without reducing network performance or affecting normal network traffic forwarding). However, it can be challenging to add network analysis devices to a network while efficiently utilizing network analysis resources. FIG. 8 is a diagram showing how an analysis network 104 coupled to a network 102 may be controlled by controller 18 to help ensure efficient utilization of network analysis resources such as analysis devices 106 and service devices 108.

Network 102 may include switches 109 (or other packet forwarding systems similar to switches 14) that forward network traffic between end hosts 110. For example, switches 109 may be interconnected via network paths coupled between ports of the switches. Network monitoring devices such as network tap devices 112 may be used to "tap" network traffic flows in network 102 by sending copies of network packets observed by tap devices 112 to analysis network 104 via paths 114 (sometimes referred to herein as tap paths). Network tap devices 112 may be interposed between network elements to monitor network traffic between the network elements. For example, a network tap device 112 may be interposed between ports of first and second switches to monitor traffic from the first to the second switch (or vice versa or both). The network tap devices may monitor traffic without interfering with network traffic flow between network elements.

Analysis network 104 may include switches 14 that are controlled by controller 18 and may sometimes be referred to as client switches (e.g., switches 14 may include controller clients that communicate with controller 18 via control paths 66). Switches that do not communicate with controller 18 via control paths 66 (e.g., because the switches do not include controller clients) may be referred to as non-client switches. In the example of FIG. 8, switches 109 do not communicate with controller 18 and may be referred to as non-client switches. This example is merely illustrative. If desired, switches 109 of network 102 may communicate with controller 18 or may communicate with a different controller (not shown).

Analysis devices 106 such as analysis devices D1 and D2 and service devices 108 such as service devices S1 and S2 may be coupled to switches 14 of analysis network 104. Analysis devices 106 may include network analysis tools such as network performance monitors, network visibility analysis tools, network capacity analysis tools, network outage analysis tools, or other network analysis tools for analyzing network 102 based on tapped network traffic flows. The network analysis tools may, for example, be implemented on computing equipment that serve as end hosts of analysis network 104 (e.g., analysis device D1 may serve as an end host of analysis network 104 and one or more analysis tools may be implemented on analysis device D1).

Service devices 108 may serve to manipulate network traffic flows prior to analysis by devices 106. Service devices 108 may manipulate network traffic flows by replacing, removing, or otherwise modifying information stored in network packets of the traffic flows. Service devices 108 may, for example, include packet slicing tools, time-stamping tools, or other tools implemented using computing equipment. Multiple tools may be implemented on a service device 108, which serves as an end host of analysis network 104.

Figure 9:
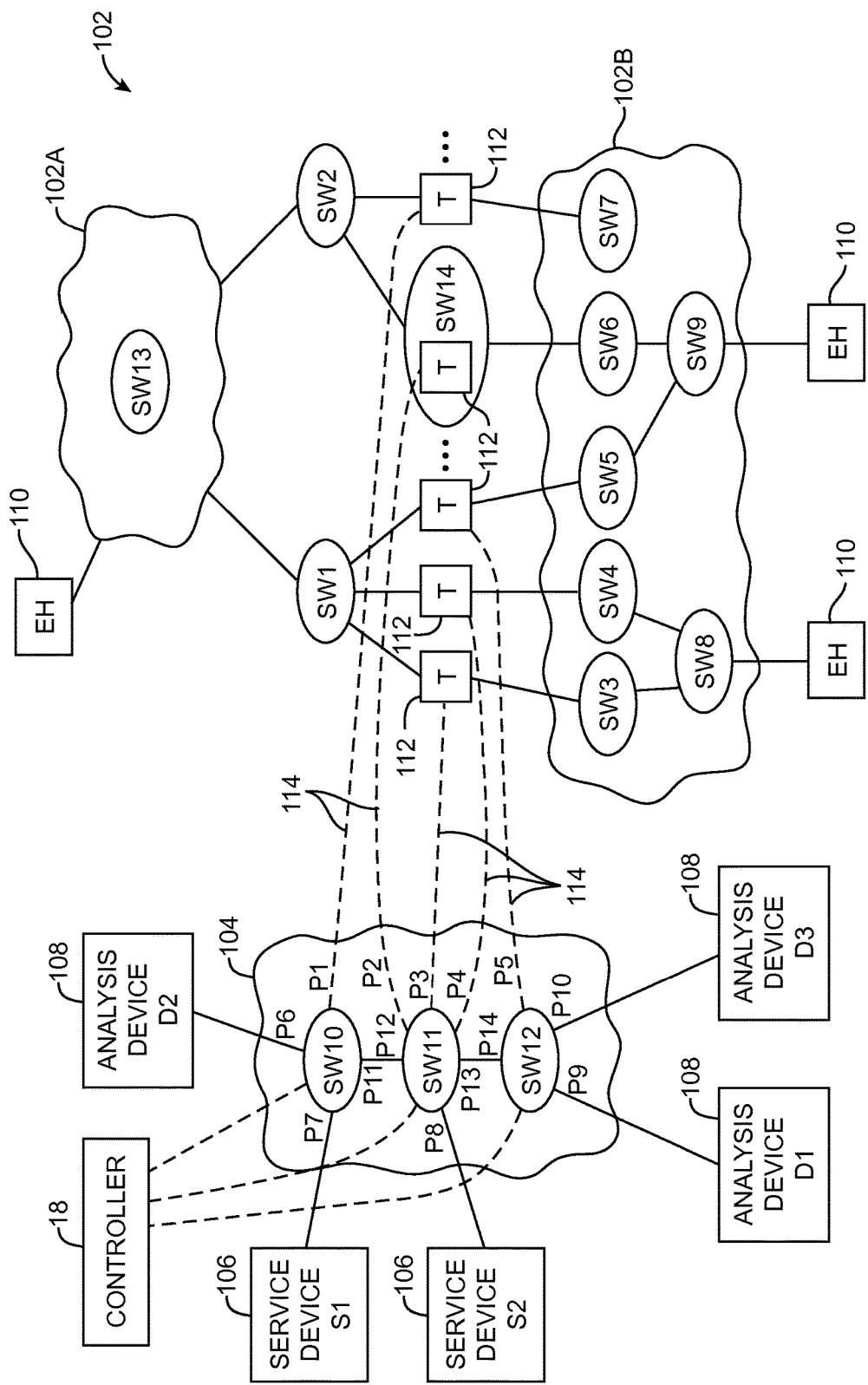
FIG. 9 is an illustrative diagram showing how an analysis network that is controlled by a controller may be coupled to network tap devices, analysis devices, and service devices in accordance with an embodiment of the present invention.

Tap paths 114 may be coupled to client switches 14 of analysis network 104 (e.g., at ports 34 of the client switches). Ports 34 of client switches 14 that are coupled to tap paths 14 may sometimes be referred to as ingress interfaces of analysis network 104, because the switch ports serve to interface with incoming network traffic from tap devices 112. Controller 18 may control client switches 14 to forward copied network traffic received from tap devices 112 to desired analysis devices 106 and service devices 108. FIG. 9 shows an illustrative scenario in which controller 18 may be used to control an analysis network 104 that is coupled to a forwarding network 102 via tap devices 112.

As shown in FIG. 9, packet forwarding network 102 may include switches SW1 and SW2 interposed between network portions 102A and 102B. Network traffic flow between network portions 102A and 102B may be routed through switches SW1 and SW2 (e.g., network traffic sent between end hosts 110). Network tap devices 112 may be interposed between switch SW1 and network portion 102B and between switch SW2 and network portion 102B. Tap devices 112 may serve to tap network traffic that passes through the tap devices by forwarding copies of the network traffic to analysis network 104. Each tap device 112 may forward copied network packets to an ingress interface of network 104 (e.g., to a port of a respective client switch of network 104). For example, a first network tap device 112 coupled between switches SW2 and SW7 may forward copied network packets to port P1 of client switch SW10, whereas a second network tap device 112 coupled between switches SW1 and SW3 may forward copied network packets to port P3 of client switch SW11. Tap devices 112 may forward copied network packets without modifying the original network traffic flow. For example, tap device 112 that is coupled between switches SW1 and SW4 may forward network packets between switches SW1 and SW4 while forwarding copies of the network packets to client switch SW11 in parallel.

If desired, tap devices 112 may be integrated into switches of the forwarding network. In the example of FIG. 9, switch SW14 that is interposed between switches SW2 and SW6 may include a tap device 112 that copies network traffic flowing between switches SW2 and SW6 through switch SW14 and forwards the copied network traffic to client switch SW11 via a tap port. In this scenario, the tap device 112 may be formed as dedicated circuitry on the switch or as software in the form of a port mirroring function (sometimes referred to as a SPAN function) that may be enabled or disabled. When the port mirroring function is enabled, all network traffic received by the switch at a first port may be copied and sent to a second port of the switch that serves as a tap port. When the port mirroring function is disabled, the second port may be unused or serve as a normal packet forwarding port.

Controller 18 may control client switches in analysis network 104 to forward copied network packets to service devices 106 and analysis devices 108 for processing. Controller 18 may provide flow table entries such as entries 68 of FIG. 6A that direct the client switches to forward the copied network packets along controller-determined network paths. For example, a network packet sent from switch SW2 to SW7 may be copied by a tap device 112 and received at client switch SW10. In this scenario, controller 18 may have provided flow table entries to client switches SW10 and SW11 that direct the client switches to forward the copied network packet to service device S1, service device S2, and analysis device D2. The copied network packet may be forwarded in sequence (e.g., first to device S1, then to device S2, and finally to device D2).

Figure 10:
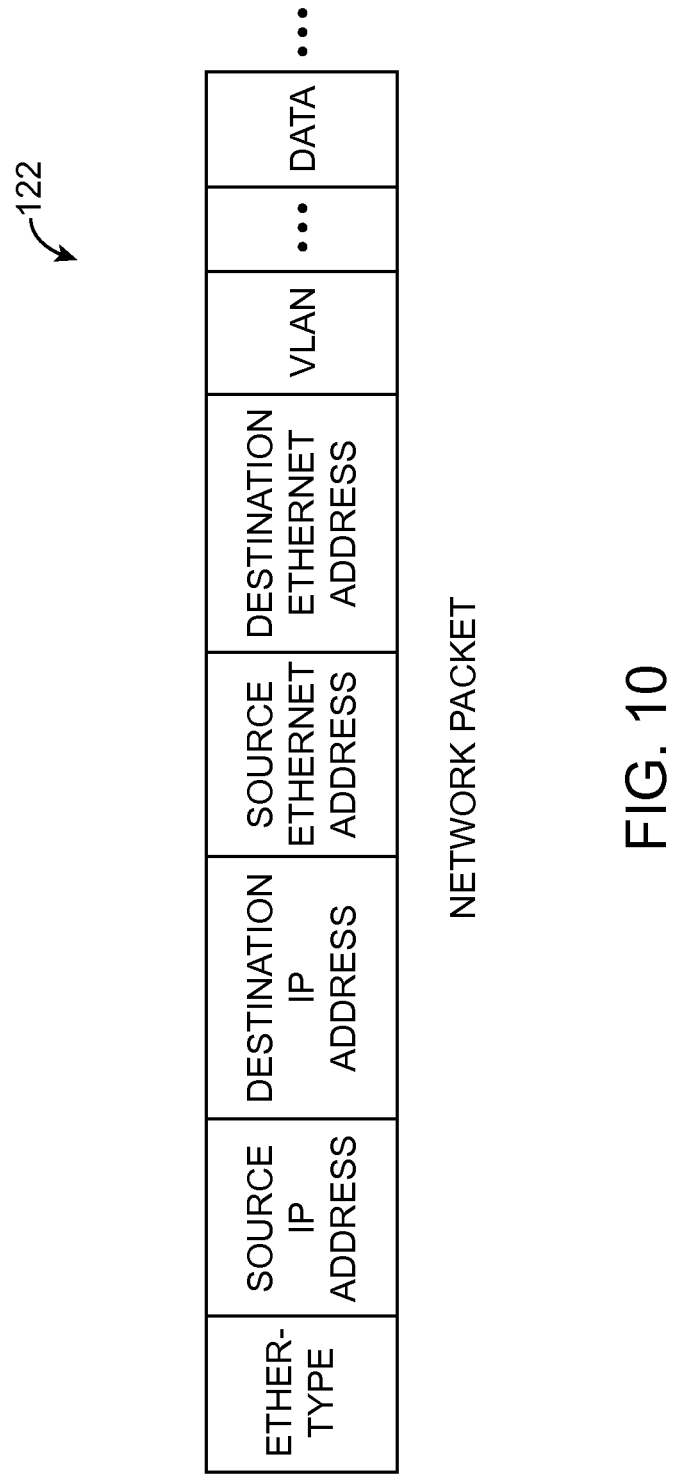
FIG. 10 is a diagram of an illustrative network packet that may be forwarded between end hosts of a packet forwarding network and copied by network tap devices in the packet forwarding network in accordance with an embodiment of the present invention.

FIG. 10 is an illustrative diagram of a network packet 122 that may be forwarded through a network such as network 102 that is monitored using analysis network 104. Network packet 122 may be sent from a source end host to a destination end host. As shown in FIG. 10, network packet 122 may include an Ethertype, a source internet protocol (IP) address, a destination IP address, a source Ethernet address, a destination Ethernet address, and a virtual local area network (VLAN) identifier stored in header fields of network packet 122. Network packet 122 may include data to be forwarded from the source end host to the destination end host through the network.

The Ethertype may identify the type of network protocol used to encapsulate information in the data field of the network packet. For example, the Ethertype may identify that the data field includes information encapsulated using the Internet Protocol, the Link Layer Discovery Protocol, or other protocols such as broadcast discovery protocols.

The source IP address and source Ethernet address of network packet 122 may correspond to addresses associated with the source end host, whereas the destination IP address and destination Ethernet address may correspond to addresses associated with the destination end host. The VLAN identifier may identify a virtual local area network that is associated with the source end host. If desired, network packet 122 may include any desired combination of network attributes shown in FIG. 10 (e.g., information stored in network packet header fields) or may include additional header fields associated with network protocols (e.g., IP header fields, Ethernet header fields, etc.).

Figure 11:
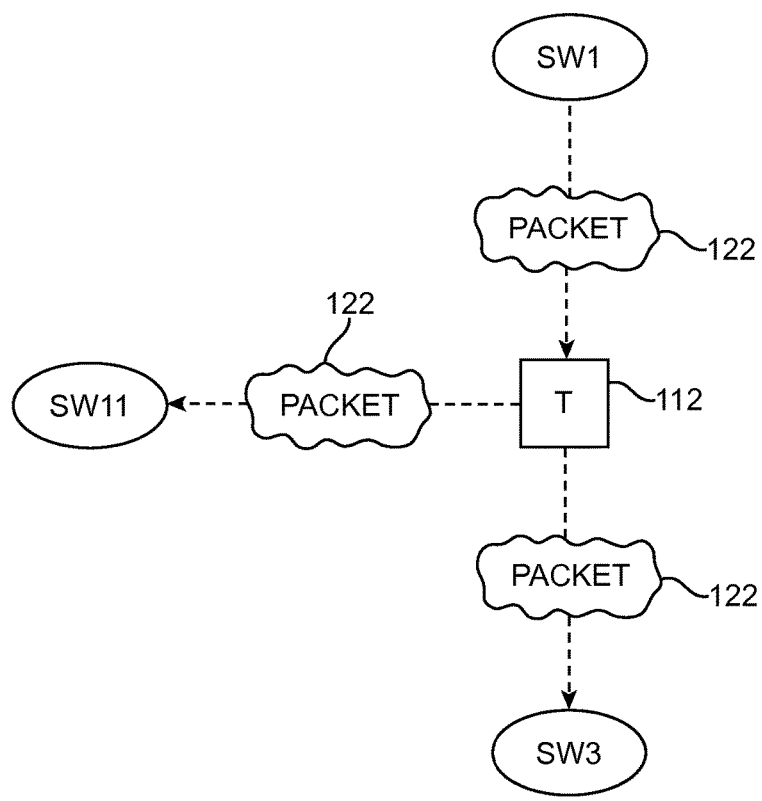
FIG. 11 is a diagram showing how a network packet may be copied by a network tap device in accordance with an embodiment of the present invention.

FIG. 11 is an illustrative diagram showing how a tap device 112 may copy network packets sent between switches SW1 and SW3 (e.g., switches SW1 and SW3 of FIG. 9). As shown in FIG. 11, a network packet 122 may be forwarded from switch SW1 to switch SW3. Network packet 122 may be received by tap device 112. Tap device 112 may forward the network packet to switch SW3 to ensure normal network operations for network 102 (e.g., the network packet may be forwarded to switch SW3 unaltered, as if no tap device was coupled between switches SW1 and SW3). Tap device 112 may, in parallel, send a copy of network packet 122 to switch SW11 (e.g., via tap paths 114 of FIG. 9).

Figure 12:
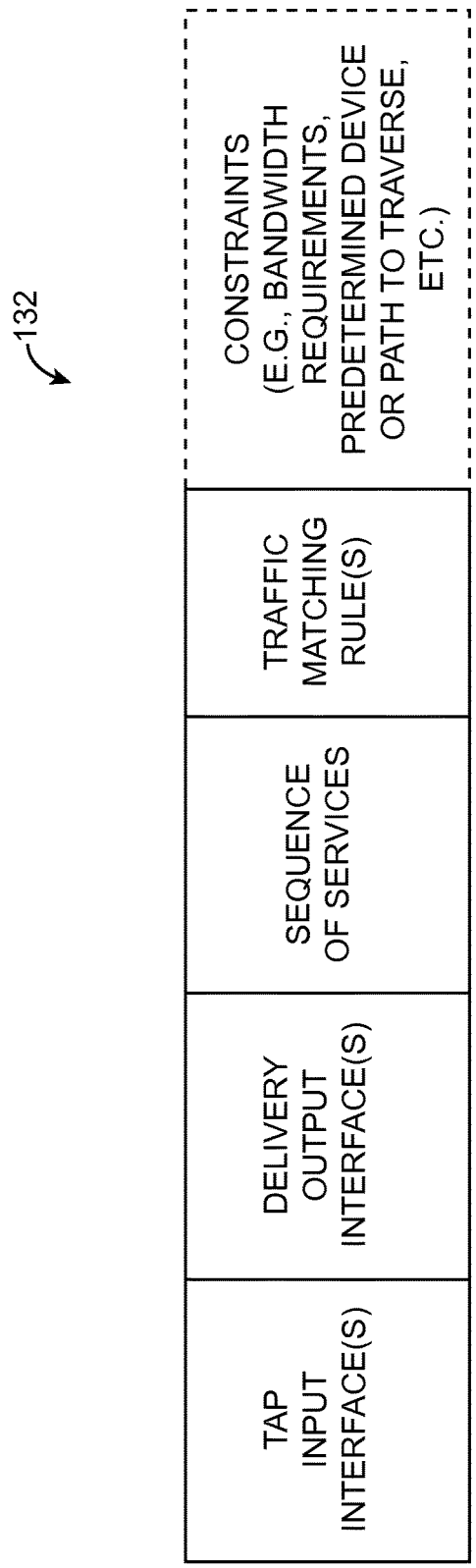
FIG. 12 is a diagram of an illustrative network policy that may be used by a controller to control client switches in an analysis network in accordance with an embodiment of the present invention.

Controller 18 may be configured to control analysis network 104 based on network policies that are sometimes referred to herein as analysis network policies or network tap policies, because the policies are used to control how tapped network traffic flows are handled by analysis network 104. The analysis network policies may be provided, for example, by a user such as a network administrator. FIG. 12 is a diagram of an illustrative analysis network policy 132 that may be used by controller 18 to control analysis network 104.

As shown in FIG. 12, analysis network policy 132 may include fields for tap input interfaces, delivery output interfaces, a sequence of services to be performed, and traffic matching rules. The example of FIG. 12 is merely illustrative. If desired, additional fields including information on how to handle tapped network traffic flows may be included in analysis network policy 132.

The tap input interface field may include information identifying one or more ingress interfaces of analysis network 104 at which network traffic received from tap devices 112 should be processed. The interfaces may correspond to switch ports that are coupled to tap devices 112 via paths 114. For example, the tap input interface field may identify switch port P1 of client switch SW10, switch port P2 of client switch SW11, etc.

The delivery output interface field may include information identifying one or more egress interfaces of analysis network 104 to which network traffic should be forwarded. The delivery output interface information may identify interfaces (e.g., switch ports of client switches) that are coupled to desired analysis devices. For example, the tap interface field may identify switch port P6 of switch SW10 or port P9 of switch SW12.

Analysis network policy 132 may include a sequence of services that should be performed on network traffic monitored by tap devices 112 before processing at analysis devices. In other words, policy 132 may identify services that should be performed on network traffic received at the identified tap input interfaces before forwarding the network traffic to the identified delivery output interfaces for processing at analysis devices coupled to the identified delivery output interfaces.

Tap devices such as devices 112 often tap network traffic flows indiscriminately (i.e., all network packets received by tap devices 112 are forwarded to tap input interfaces of analysis network 104). It is sometimes desirable for network analysis to be performed on only a subset of the network packets received from tap devices 112. Analysis network policy 132 may include matching rules that identify which network packets should be analyzed. The matching rules may include information to be matched to network packet headers or rules similar to flow table matching rules. For example, policy 132 may include headers similar to headers 76 of FIG. 6A. In this scenario, network packets having header fields that match the headers of policy 132 should be forwarded from the identified tap input interfaces to the identified delivery output interfaces, whereas network packets that do not have matching headers should be dropped (e.g., controller 18 may direct the client switches to drop the non-matching network packets).

If desired, analysis network policy 132 may include additional constraints that may be used by controller 18 to generate flow table entries for processing copied network traffic flows received at tap input interfaces. Optional per-policy bandwidth requirements may be specified to help ensure that tapped network traffic flows are provided with sufficient forwarding bandwidth. For example, a per-policy bandwidth requirement may be defined that specifies a minimum data forwarding rate (e.g., defined in bytes per second) from the tap input interfaces to the delivery output interfaces of policy 132 (e.g., through client switches of analysis network 104). Controller 18 may control client switches to help ensure that per-policy bandwidth requirements of each policy 132 are satisfied. Controller 18 may, for example, determine network paths for each policy 132 based on available bandwidth of each client switch to satisfy the bandwidth requirements of policies 132. Higher priority policies that include bandwidth requirements may take precedence over lower priority policies (e.g., policies that do not include bandwidth requirements).

Optionally, predetermined paths through which tapped network traffic associated with analysis network policy 132 should be forwarded may be specified in the policy. For example, a network administrator may specify that tapped network traffic received at tap input interfaces of a policy 132 should be forwarded through one or more given switches, links, switch ports, other network path elements, or combinations of network path elements.

Figure 13:
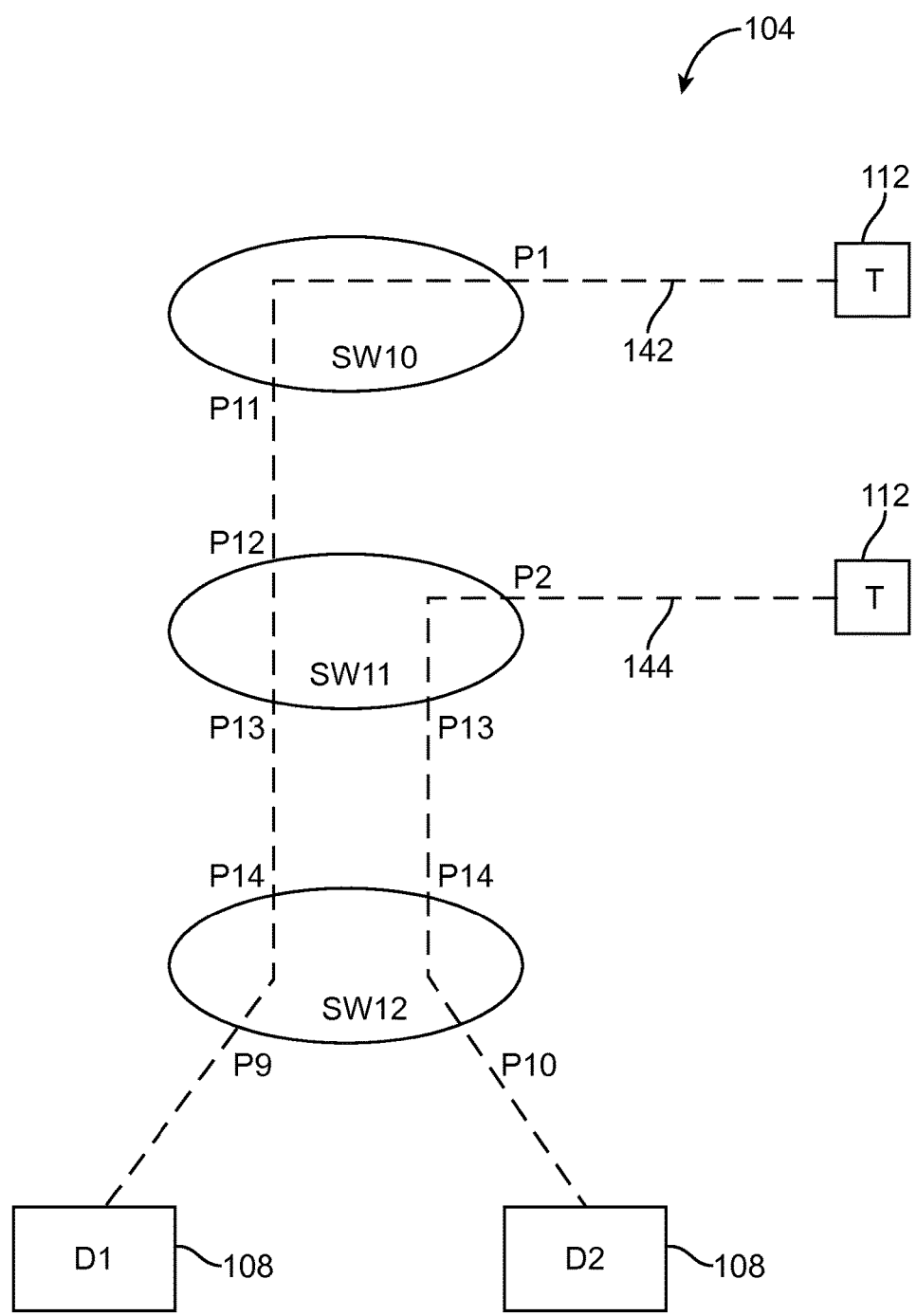
FIG. 13 is an illustrative diagram showing how network paths generated for different network policies may overlap in accordance with an embodiment of the present invention.

In some scenarios, it can be challenging for controller 18 to generate appropriate network forwarding paths that satisfy multiple analysis network policies. FIG. 13 is an illustrative example in which different network forwarding paths may be generated (e.g., for different analysis network policies).

In the example of FIG. 13, controller 18 may generate network paths 142 and 144 based on network policies. Network path 142 may be generated based on a network policy that requires tapped network traffic from network tap 112 that is coupled to port P1 to be routed to analysis device D1. Path 142 may include links between network elements such as a link between ports P11 and P12 of switches SW10 and SW11, a link between ports P13 and p14, and a link between port P9 and analysis device D1. Network path 144 may be generated from a policy that requires tapped network traffic received at port P2 to be forwarded to analysis device D2. Path 144 may include links between P13 and P14 and between P10 and analysis device D2.

Figure 14:
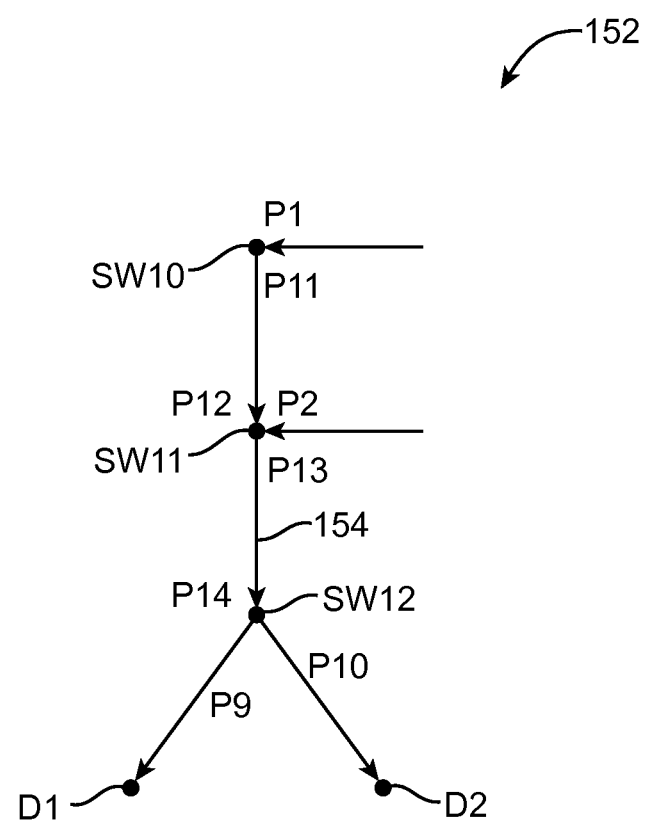
FIG. 14 is an illustrative diagram showing how multiple network paths generated for network policies may include shared links in accordance with an embodiment of the present invention.

Network paths 142 and 144 may overlap between switches SW11 and SW12, because each path includes a link between ports P13 and P14. Controller 18 may generate a set of forwarding paths that implements paths 142 and 144. A set of controller-generated forwarding paths for forwarding tapped network traffic through an analysis network may sometimes be referred to as network forwarding graph or a delivery graph. FIG. 14 is an illustrative network forwarding graph 152 that may be generated by controller 18 to implement network paths 142 and 144 of FIG. 13.

As shown in FIG. 14, network forwarding graph 152 may include network elements such as switches and other network devices. Forwarding graph 152 may include forwarding paths that control how tapped network traffic is routed. For example, tapped network traffic received at port P1 is routed to port P12 of client switch SW11 via a forwarding path between port P11 of switch SW10 and port P12 of switch SW11. Controller 18 may implement forwarding graph 152 by providing appropriate flow table entries to client switches of the forwarding graph. For example, a flow table entry may be provided to client switch SW11 that directs client switch SW11 to forward network packets received at ports P2 and P12 to port P13. As another example, a flow table entry may be provided to client switch SW10 that controls client switch SW10 to forward network packets received at port P1 to client switch SW11 via port P11.

Controller 18 may dynamically adjust forwarding graph 152 to accommodate network topology changes. For example, controller 18 may monitor the network to detect network topology changes based on network traffic forwarded by the client switches. If one or more switches or links fails, controller 18 may dynamically adjust forwarding graph 152 and implement the updated forwarding graph to accommodate the network failure (e.g., by modifying the forwarding graph to route network traffic around the failed network element or elements). If one or more switches or links is added to the network topology, the controller may dynamically adjust forwarding graph 152 based on corresponding network policies. For example, the forwarding graph may be adjusted to utilize the newly added links or switches while satisfying constraints of the network policies.

In some scenarios, link failures can potentially disrupt communications between controller 18 and client switches (e.g., partial or full failures of control paths 66). However, network forwarding paths that have been implemented by controller 18 may be maintained by the client switches even when control communications is disrupted. For example, flow table entries that have been provided to the client switches may be maintained by the client switches even when communications with controller 18 is disrupted.

Network forwarding graph 152 may include a forwarding path 154 that is shared between network paths 142 and 144 of FIG. 13 (i.e., shared between different network paths). In this scenario, it may be challenging to differentiate between network traffic belonging to path 142 and path 144, because each path is routed through a network link between ports P13 and P14. For example, a flow table entry provided to client switch SW12 may be unable to differentiate between network traffic belonging to path 142 and path 144, because network packets for paths 142 and 144 are each received at port P14. Network traffic differentiation is especially challenging when tapped network packets received at input ports P1 and P2 are similar or identical, such as when a broadcast network packet is received at both ports P1 and P2.

Figure 15:
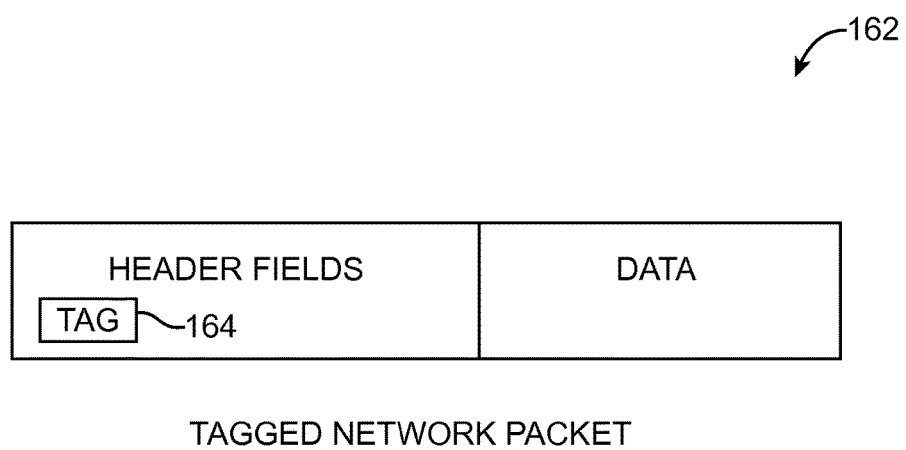
FIG. 15 is a diagram of an illustrative tagged network packet that may be used to accommodate shared links in network paths generated for network policies in accordance with an embodiment of the present invention.

To accommodate scenarios in which network links are shared between network forwarding paths (e.g., network forwarding paths generated for different network policies), controller 18 may direct client switches to tag network packets at input interfaces (ingress interfaces) of analysis network 104. For example, controller 18 may provide flow table entries to client switches that include the input interfaces. The provided flow table entries may direct the client switches to modify, add, or replace header information of network packets received at the input interfaces with an identification tag. FIG. 15 is an illustrative diagram of a tagged network packet that may be produced by controlling client switches with a controller.

As shown in FIG. 15, tagged network packet 162 may include header fields and data similar to network packet 122 of FIG. 10 (e.g., network packet 162 may include header fields such as source and destination address fields, etc.). Tagged network packet 162 may include an identification tag 164 stored in the header fields. Tag 164 may identify the port at which the originating network packet was received. This example is merely illustrative and, if desired, tag 164 may include information such as information identifying which network policy is associated with the tagged network packet.

Tag 164 may be stored in one or more unused header fields or stored in unused portion of a header field. For example, a network administrator may specify header fields that are unused by network protocols associated with tapped network traffic. In this scenario, the network administrator may configure controller 18 to store tag information in the unused header fields. If desired, unused bits or other unused portions of a header field may be used to store tag information.

Controller 18 may maintain information identifying network traffic and policy conditions. The information may be maintained in a database, table, or other data storage structures at controller 18 (e.g., in storage 19 of FIG. 8). FIG. 16 is an illustrative table 172 that includes entries 174 that identify network conditions for respective network links. Table 172 may sometimes be referred to herein as a network conditions table.

Each entry 174 may identify a link and one or more network traffic and/or policy conditions for the identified link. For example, entries 174 may include entries for links between switches SW10 and SW11 and between switches SW11 and SW12. Network policy conditions identified for a link may include a number of policies and/or a number of matching rules associated with the link. For example, controller 18 may determine how many network policies for which network forwarding paths that include the link have been generated. The number of matching rules included in the network forwarding paths may be identified. Bandwidth requirements of the identified network policies may be stored individually and/or combined bandwidth requirements of all network policies associated with the link may be identified.

Current network traffic conditions such as current bandwidth usage may be stored. For example, controller 18 may periodically request current bandwidth usage information from client switches (e.g., how much data is being conveyed through each port of the client switches) or may otherwise monitor current network traffic conditions. Controller 18 may, for example, compare the current bandwidth usage information to known client switch bandwidth capabilities when implementing network policies.

Controller 18 may generate and/or update network forwarding paths based on network traffic and policy conditions stored in table 172. For example, controller 18 may generate network forwarding paths while ensuring that network traffic load is balanced among links or switches (e.g., based on current bandwidth usage compared to the bandwidth capabilities of the client switches). In this scenario, controller 18 may use links with lower bandwidth usage to generate network forwarding paths. As another example, controller 18 may generate network forwarding paths while ensuring that bandwidth requirements of network policies are satisfied (e.g., so that bandwidth requirements of all network policies associated with each link are satisfied). As yet another example, controller 18 may generate network policies while ensuring that the number of policies and/or matching rules are balanced among the links of the analysis network (e.g., so that the number of policies and/or matching rules per link are substantially equal or within a predetermined margin of tolerance).

The example of FIG. 16 in which multiple network policy and traffic conditions per network link are stored in table 172 is merely illustrative. If desired, a selected network policy and traffic condition or any desired combination of network policy and traffic conditions may be stored per network link. Entries 174 may, if desired, identify network policy and traffic conditions for respective switches, switch ports, or other network elements (e.g., instead of network links).

Figure 17:
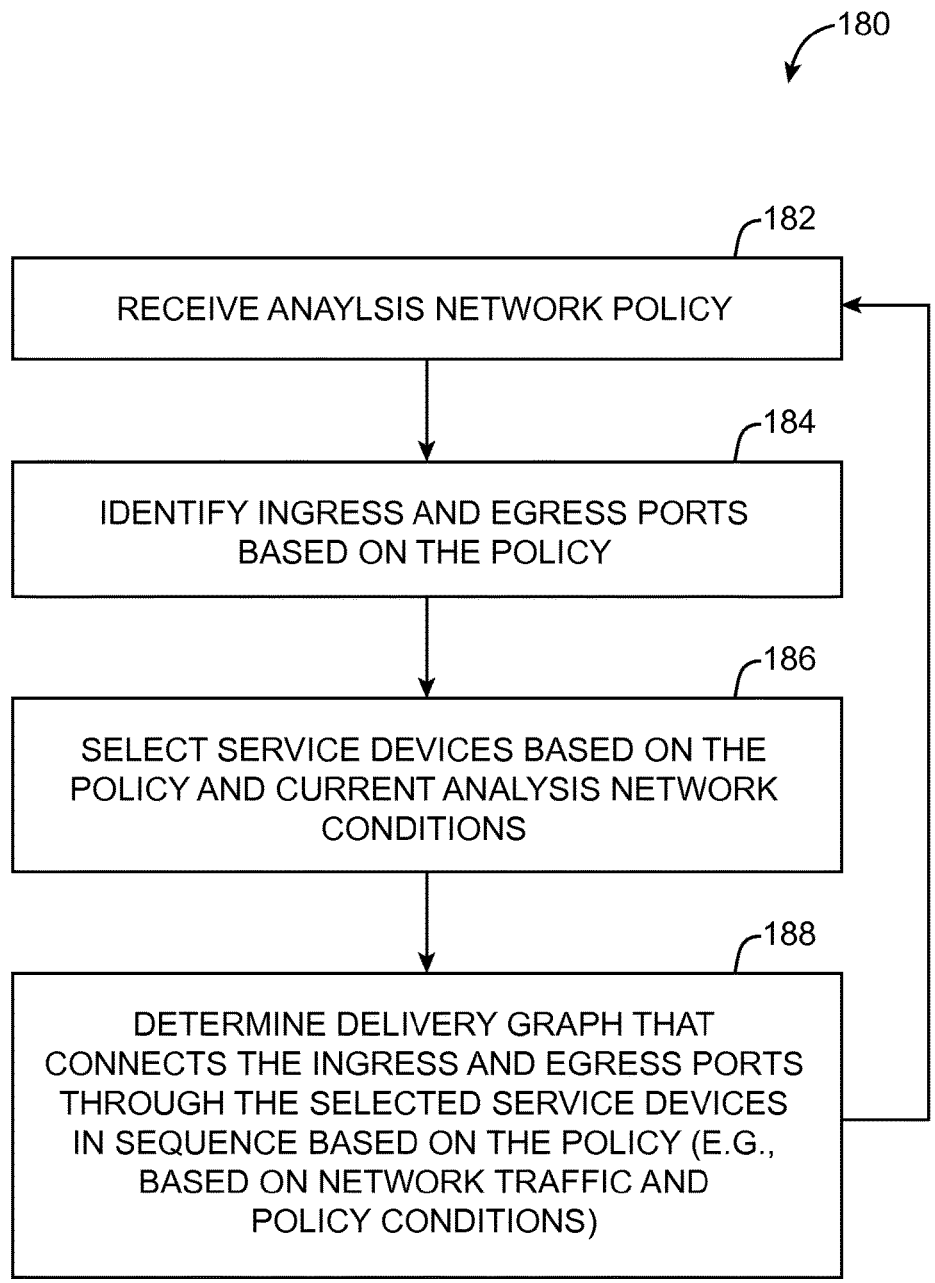
FIG. 17 is a flow chart of illustrative steps that may be performed by a controller to control switches in an analysis network based on network policies in accordance with an embodiment of the present invention.

FIG. 17 is a flow chart 180 of illustrative steps that may be performed by controller 18 to control client switches in an analysis network based on analysis network policies. Service and analysis devices may be coupled to interfaces of the analysis network (e.g., switch ports).

During step 182, controller 18 may receive an analysis network policy. For example, controller 18 may receive an analysis network policy 132 (FIG. 12) from a network administrator.

During step 184, controller 18 may identify ingress and egress ports based on the analysis network policy. For example, controller 18 may retrieve ingress and egress port information from the tap input port and delivery output port fields of the analysis network policy.

During step 186, controller 18 may select service devices based on the policy and current analysis network conditions. Controller 18 may maintain lists of service devices that are capable of performing each possible service. For example, controller 18 may maintain a first list of service devices that are capable of timestamping, a second list of service devices that are capable of packet slicing, etc. Consider the scenario in which the policy includes a sequence of services that should be used to process network packets matching the policy before the network packets are forwarded to the egress ports. In this scenario, controller 18 may select service devices from each list. The service devices may be selected based on current processing load at the service devices (e.g., so as to balance processing load among the service devices that are capable of performing each service). The service devices may be selected based on network topology of the analysis network (e.g., to help reduce switching load and forwarding latency).

During step 188, controller 18 may determine a delivery graph that couples the ingress and egress ports through the selected service devices. The delivery graph may forward network traffic through the selected service devices in the sequence identified by the analysis network policy. The delivery graph may, if desired, be determined as a spanning tree that does not include links shared between network policies (e.g., link 154 of FIG. 14). The delivery graph may, if desired, be formed as a spanning tree that includes vertices (e.g., client switches) and edges (e.g., network links) that couple the ingress and egress ports through the selected service devices in sequence without including any forwarding loops in the graph. The delivery graph may be determined partly on network traffic and policy conditions (e.g., based on a network traffic and policy condition table such as table 172 of FIG. 16).

Upon completion of step 188, the process may return to step 182 to process additional analysis network policies.

The foregoing is merely illustrative of the principles of this invention and various modifications can be made by those skilled in the art without departing from the scope and spirit of the invention.

What is claimed is:

1. A method of using a controller that controls switches in an analysis network coupled to a packet forwarding network, wherein the switches include ports and wherein the analysis network includes interfaces formed from respective ports of the switches, the method comprising:

at the controller, receiving a network policy for the analysis network that identifies ingress interfaces of the analysis network coupled to the packet forwarding network, egress interfaces of the analysis network, and a sequence of packet manipulation services;

using the controller, identifying a path in a delivery graph to forward network packets tapped from the packet forwarding network through the analysis network based on the network policy, wherein the path couples at least one of the ingress interfaces to at least one of the egress interfaces through at least one of the switches in the analysis network, wherein the delivery path is dynamically adjustable for flexible path generation in the analysis network, and wherein identifying the path in the delivery graph comprises:

selecting at least first and second network packet manipulation devices that are each coupled to the path at different respective locations between the at least one of the ingress interfaces and the at least one of the egress interfaces, wherein an order of the respective locations along the path is determined by the sequence of packet manipulation services, and wherein the path includes a first path segment coupling the at least one ingress interface to the first network packet manipulation device through a first set of switches in the switches in the analysis network and a second path segment coupling the first network packet manipulation device to the second network packet manipulation device through a second set of switches in the switches in the analysis network that is different from the first set of switches;

using the controller, generating flow table entries to implement the path in the delivery graph, wherein each flow entry includes a header field and a corresponding action field; and using the controller, providing the generated flow table entries to the switches, wherein the switches are configured to process the tapped network packets by comparing packet fields in the tapped network packets with header fields in the generated flow table entries and performing an action in a given action field when there is match between a given packet field and a given header field;

wherein the path includes a third path segment coupling the second network packet manipulation device to the at least one egress interface through a third set of switches in the switches that is different from the first and second sets of switches.

2. The method defined in claim 1 wherein the egress interfaces are coupled to network traffic analysis devices, the method further comprising:

controlling the switches to forward the network packets received at the ingress interfaces along the delivery graph.

3. The method defined in claim 2 further comprising:

tagging each of the network packets received at the ingress interfaces with information identifying the ingress interface at which the network packet was received.

4. The method defined in claim 2 wherein the network policy includes matching rules and wherein the network packets include header fields, the method further comprising:

controlling the switches to forward only network packets that are received at the ingress interfaces and have header fields that match the matching rules.

5. The method defined in claim 2 wherein controlling the switches to forward the network packets received at the ingress interfaces along the delivery graph comprises:

configuring the switches so that the network packets received at the ingress interfaces continue to be forwarded along the delivery graph even when communications between the switches and the controller is disrupted.

6. The method defined in claim 1 further comprising:

monitoring the analysis network to detect network topology changes; and adjusting the delivery graph based on the detected network topology changes.

7. The method defined in claim 1 further comprising:

with the controller, controlling the at least one of the switches to implement the path in the delivery graph by generating corresponding flow table entries for the at least one of the switches and providing the flow table entries to the at least one of the switches over a control path.

8. The method defined in claim 7 further comprising:

monitoring the analysis network to detect network topology changes;

adjusting the delivery graph based on the detected network topology changes; and generating updated flow table entries for the at least one of the switches based on the detected network topology changes.

9. The method defined in claim 1 wherein first path segment exits the analysis network and the second path segment re-enters the analysis network.

10. The method defined in claim 1 wherein a given network packet in the network packets that matches on the generated flow table entries to implement the path is forwarded from the at least one ingress interface to the at least one egress interface along the first and second path segments.

* * * * *